United States Patent
Wolfenbarger et al.

(10) Patent No.: US 9,388,847 B1
(45) Date of Patent: Jul. 12, 2016

(54) BOTTOM BRACKET FOR BICYCLES

(71) Applicants: Wesley Warren Wolfenbarger, Little Rock, AR (US); Gary Edward Mailhiot, Jr., Little Rock, AR (US)

(72) Inventors: Wesley Warren Wolfenbarger, Little Rock, AR (US); Gary Edward Mailhiot, Jr., Little Rock, AR (US)

(73) Assignee: Wesley Warren Wofenbarger, Little Rock, AR (US)

( * ) Notice: Subject to any disclaimer, the term of this patent is extended or adjusted under 35 U.S.C. 154(b) by 0 days.

(21) Appl. No.: 14/552,819

(22) Filed: Nov. 25, 2014

Related U.S. Application Data

(60) Provisional application No. 61/911,836, filed on Dec. 4, 2013.

(51) Int. Cl.
*F16C 13/02* (2006.01)
*F16C 43/04* (2006.01)
*F16C 9/02* (2006.01)
*F16C 35/077* (2006.01)

(52) U.S. Cl.
CPC .............. *F16C 9/02* (2013.01); *F16C 35/077* (2013.01); *F16C 2326/28* (2013.01)

(58) Field of Classification Search
CPC .............. F16C 35/067; F16C 2326/28; B60B 27/0005; B62K 19/34
USPC .................... 384/458, 537, 538, 545
See application file for complete search history.

(56) References Cited

U.S. PATENT DOCUMENTS

| | | | |
|---|---|---|---|
| 3,578,829 A | 5/1971 | Hata | |
| 3,903,754 A | 9/1975 | Morroni | |
| 4,252,384 A | 2/1981 | Duvoisin | |
| 5,076,601 A | 12/1991 | Duplessis | |
| 5,209,581 A | 5/1993 | Nagano | |
| 5,924,336 A | 7/1999 | Richardson | |
| 6,435,726 B1 | 8/2002 | Chi | |
| 6,550,355 B1 * | 4/2003 | Chiang | 74/594.1 |
| 7,607,507 B2 * | 10/2009 | Lane et al. | 180/260 |
| 7,650,817 B2 * | 1/2010 | Shiraishi et al. | 74/594.1 |
| 7,762,571 B2 | 7/2010 | Dodman | |
| 2007/0137424 A1 | 6/2007 | Kitagawa | |
| 2007/0204722 A1 | 9/2007 | Dal Pra | |
| 2008/0056635 A1 | 3/2008 | Lee | |
| 2008/0164673 A1 | 7/2008 | Lane | |
| 2009/0145262 A1 | 6/2009 | Pasqua | |
| 2010/0220947 A1 | 9/2010 | Earle | |
| 2011/0126666 A1 | 6/2011 | McAinsh | |
| 2013/0064488 A1 | 3/2013 | Shiraishi | |

OTHER PUBLICATIONS

Cannondale Corp. http://www.bb30standard.com/bb30-technology/.

* cited by examiner

*Primary Examiner* — Phillip A Johnson
(74) *Attorney, Agent, or Firm* — Joe D Calhoun

(57) ABSTRACT

A bottom bracket assembly for bicycle frames aligns crankshaft bearings. The assembly is press fitted into the bottom bracket shell to journal the crankshaft. An elongated, rigid, unibody sleeve comprises a terminal end and a spaced apart leading end which both receive and support a radial contact bearing that is press fitted into a machined bore. Each bore comprises an interference fit zone for bearing retention and a larger, pressure relief zone comprising a channel and an adjacent, buffering slope that compensates for stresses. Dust shields coaxially abut the bearing exteriors. An inner, tubular buttress bushing coaxially occupies the sleeve interior and extends between the spaced apart bearings to brace them. Externally the sleeve has a pair of integral, friction retention contact interfaces separated by a reduced diameter optimization zone. The sleeve terminal end has an integral stop flange that abuts the frame bottom bracket shell contacting the crank arm.

14 Claims, 13 Drawing Sheets

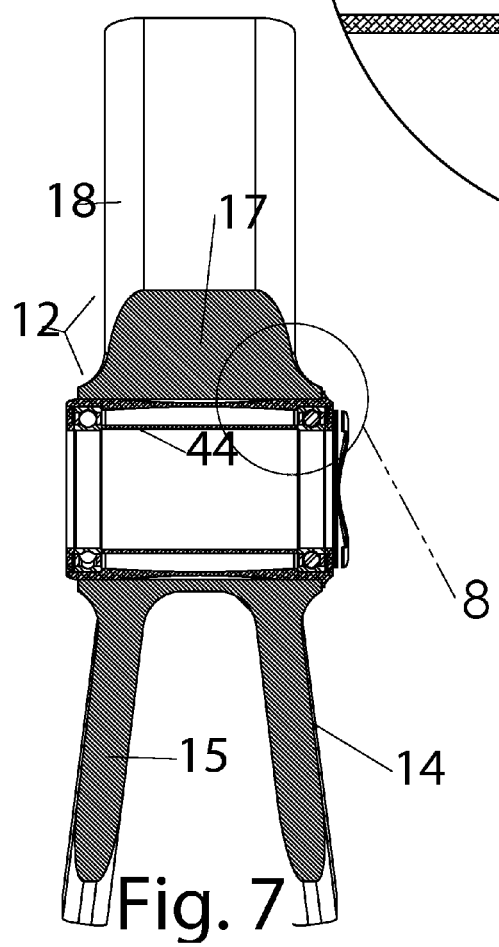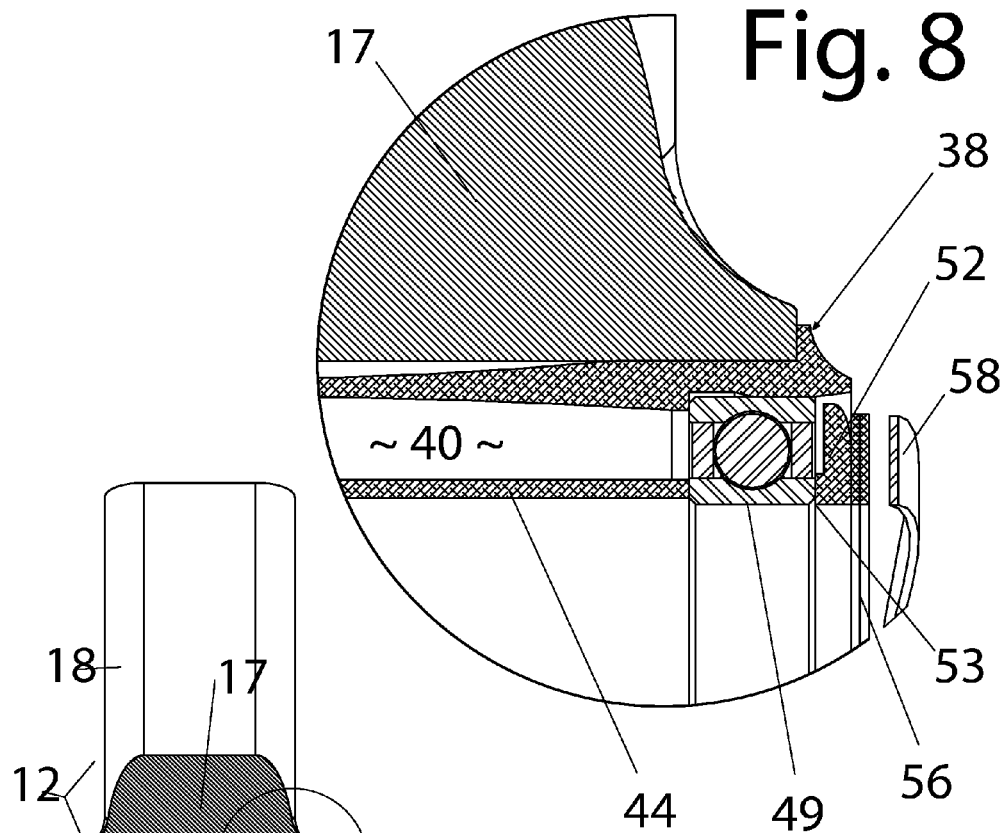

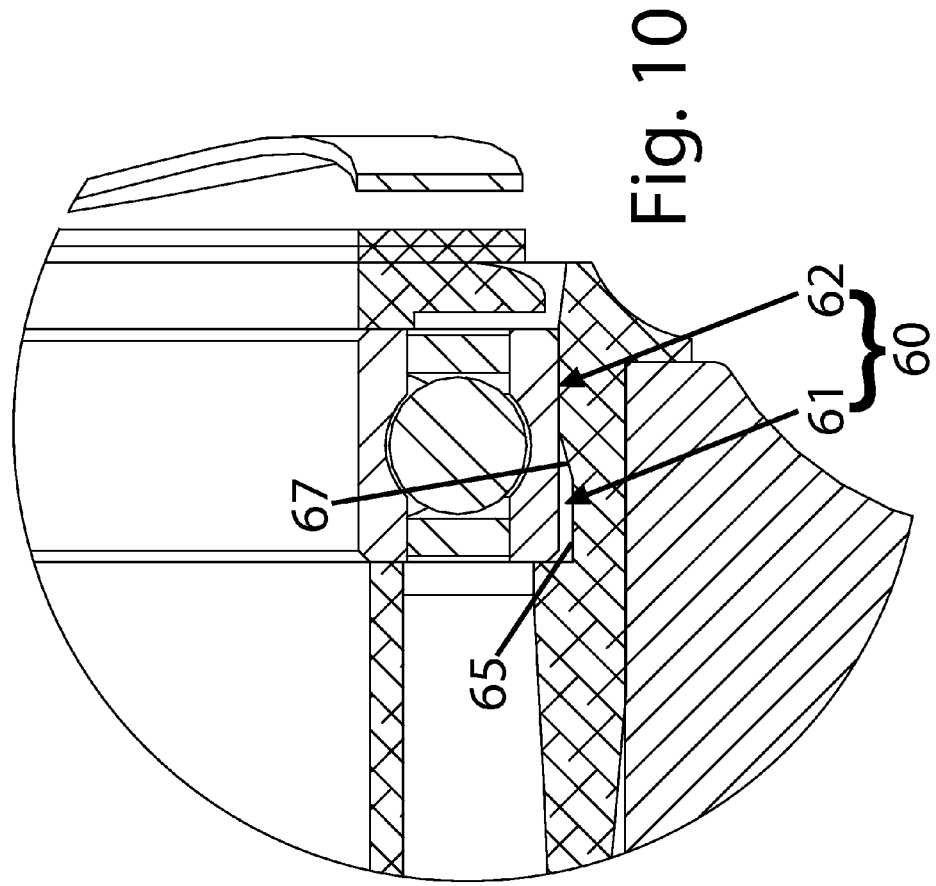
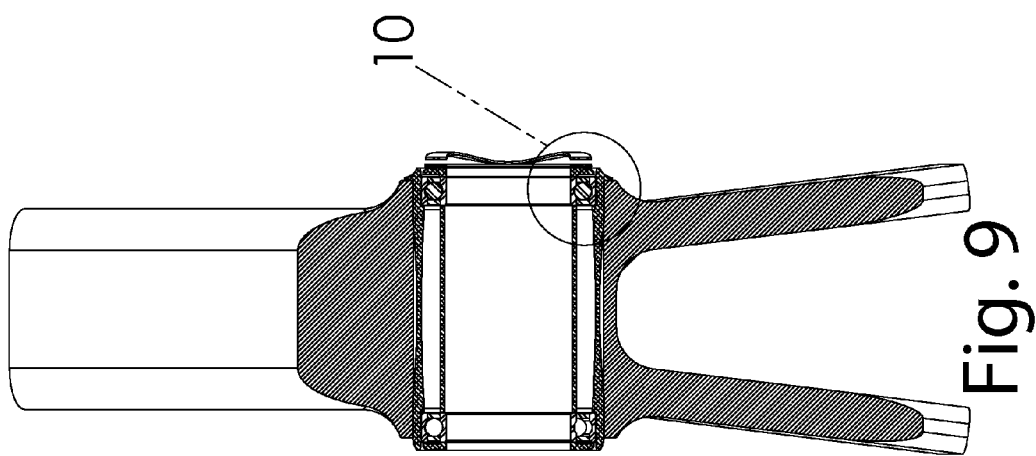

BOTTOM BRACKET FOR BICYCLES

CROSS REFERENCE TO RELATED APPLICATION

This utility patent application is based upon, and claims priority from, U.S. Provisional patent application Ser. No. 61/911,836, filed Dec. 4, 2013, entitled "Bottom Bracket for Bicycles", by inventors Wesley Warren Wolfenbarger and Gary Edward Mailhiot Jr., the entire disclosure of which is hereby incorporated by reference.

BACKGROUND OF THE INVENTION

I. Field of the Invention

The present invention relates generally to improvements in bicycle bearing bottom brackets in which a rotatable crankshaft is journaled for rotation. More particularly, the present invention relates to single-piece, bearing modules that support bearings disposed at opposite ends of the crankshaft proximate the bicycle pedals, and to bearing fitments for said bearings.

Bicycling has grown in popularity for numerous reasons. Bicycling is a popular form of recreation, offering the rider vigorous outdoor exercise. Of course, bicycling is a means of transportation utilized by many. Moreover, bicycling has become a very popular competitive sport for both amateurs and professionals. Lightweight bicycle frames formed of fiber and resin composite materials have become very popular, and such composite designs exhibit numerous advantages and benefits when compared to older, heavier, mostly metallic designs.

Modern composite bicycles are characterized by numerous advantages relating to efficiency. For example, they offer reduced aerodynamic drag, enhanced lateral stiffness, and appreciably lower mass than metallic designs. Benefits provided by reduced weight bike parts are well known. Benefits include increased acceleration, enhanced maneuverability, and in some cases, improvements in overall reliability. To further reduce the weight, lighter, composite materials have been substituted for the more commonly used metals.

Composite materials are created from plastics involving high-strength fiber reinforcements and an appropriate matrix material. Layers of graphite fibers, glass fibers, aramid fibers, polyethylene fibers or other fibers are employed in composite designs. Modern composite monocoque bicycle frames are molded entirely of resin impregnated carbon fiber material. Because most of these designs lack any metallic features into which threads could be cut to mechanically retain bearing housings in the frame bottom bracket shell, the facility for an unthreaded, press fit, or friction fit bottom bracket has been adopted industry-wide.

Whether the bicycle is used for recreation, transportation, exercise, or competition, various bicycle components are continuously evolving. Simply stated, the basic design goal is to increase strength and durability, while reducing weight and friction. One area that has been extensively redesigned involves the bicycle frame bottom bracket shell, which is a tubular housing or passageway in which the pedal-supporting crankshaft is rotatably supported by the bottom bracket bearing assembly. The bottom bracket bearing assembly within this housing is often termed a "bottom bracket" in the art.

Different types of bottom bracket bearing assemblies exist. Generally speaking, a conventional bicycle bottom bracket bearing assembly supports a rigid, rotating shaft connecting to and supporting crank arms on opposite sides of the frame. Suitable bearings rotatably support the crankshaft or spindle on opposite ends. The bottom bracket bearing assembly aligns the bearings to the rotating axis of the crankshaft or spindle. The shaft may be journaled for rotation within a tubular sleeve structure coaxially fitted within the bicycle's tubular shell at the lower frame region. The crank arms dynamically support the cyclists' pedals.

Some bottom bracket bearing assemblies hold left and right bearings internally via a separate cup that is threaded into the frame bottom bracket shell. For example, one common type of bottom bracket bearing assembly is the Shimano-style cartridge bottom bracket. The cartridge bearings are inserted into the bottom bracket shell of the bicycle frame. Cups are threaded into opposed sides of the bottom bracket shell to hold the cartridge in place.

However, deficiencies exist with such bottom bracket assemblies. First, the threads of the bottom bracket shell increases the cost of manufacturing the bicycle frame. Second, the threaded portions are cut into the frame post facto, leading to bearing alignment issues which increase dag and can shorten bearing service life. Furthermore, the pre-load, or axial end play setting of the coaxial bearings that determines how tight or lose the bearings will run in their races must be carefully adjusted by an experienced professional, or else bearing performance can be compromised, usually through bearing misalignment in response to crankshaft load.

The latest bicycle frame designs are entirely constructed of carbon fiber and feature unthreaded, press fit, or friction fit bottom bracket shells. These frame bottom bracket shells require press fit, or friction fit bottom bracket bearing assemblies. Said assemblies are generally comprised of two, identical composite bearing housings containing press fitted bearings. The composite housings are pressed into the bicycle frame bottom bracket shell, one into each side, and are unitized only by the frame and the journaled crankshaft or spindle. Shortcomings of this design include uneven radial compression of bearings due to lack of molded frame shell concentricity, shortened bearing service life due to side-loading, and increased bearing friction or "drag" caused by a lack of, or inconsistency of coaxial bearing alignment. Our design is an improvement of this two piece, press fit format.

U.S. Pat. No. 3,578,829 issued May 18, 1971 discloses a bicycle bottom bracket having a pair of ball bearings for supporting a crankshaft, at least one of the bearings having an inner race slidable with respect to the crankshaft, and a coil spring pressuring the bearings to mitigate the need for the aforementioned pre-load adjustment by a professional. The construction facilitates smooth rotation of the crankshaft.

U.S. Pat. No. 3,903,754 issued Sep. 9, 1975 discloses a crank shaft assembly for a bottom bracket which permits accurate adjustments of the crank shaft. A housing receives a shaft, bearings for rotatably supporting the shaft, and adjustable retaining members for retaining the shaft in the housing in axial alignment.

U.S. Pat. No. 4,252,384 issued Feb. 24, 1981 discloses a bicycle crank gear assembly including a replaceable cartridge. The weather sealed, preadjusted cartridge is replaceably installed in a crank gear box in a cycle frame. A clamping device secures the cartridge in the crank gear box.

U.S. Pat. No. 5,076,601 issued Dec. 31, 1991 discloses a high strength, composite bicycle frame in which the instant invention may be advantageously employed. The frame comprises fiber reinforced, resin impregnated composite material.

U.S. Pat. No. 5,209,581 issued May 11, 1993 discloses means for rotatably mounting bicycle crank arms in a bottom bracket. The crank shaft unit includes a crank shaft having connecting projections formed at opposite ends thereof for engaging inside walls of bosses of the crank arms, a cylindrical member surrounding the crank shaft, and bearings for rotatably supporting the crank shaft inside the cylindrical member. The adapters are mounted between an inside wall of the bottom bracket and the crank shaft unit.

U.S. Pat. No. 5,924,336 issued Jul. 20, 1999 discloses a hollow bicycle crankshaft including a shaft assembly having a first shaft member fastened to a second shaft member, a hollow left crank arm, a hollow right crank arm, a tubular housing member, a first shaft bearing, a second shaft bearing, and a sprocket bracket. The shaft assembly is housed within the tubular housing. The first and second shaft bearings, disposed at each end of the housing member, secure the tubular housing member about the shaft assembly in coaxial and concentric alignment.

U.S. Pat. No. 6,435,726 issued Aug. 20, 2002 discloses a bicycle bottom bracket assembly including an outer tube connected to a bicycle frame with first and second inner threaded sections respectively defined in opposite, inner ends of the tube. A roller bearing is engaged with an inner periphery of the first end of the inner tube. A positioning ring is engaged with the second inner threaded section of the outer tube. An axle extends through the roller bearing and the bearing.

U.S. Pat. No. 7,762,571 issued Jul. 27, 2010 discloses a split bottom bracket assembly with an upper portion is formed integrally with the bicycle frame and a lower portion is detachably connectable to the upper portion, the lower portion. The bottom bracket assembly journals a crankshaft with associated bearings.

U.S. Pub. No. 20070137424 published Jun. 21, 2007 discloses a bicycle bottom bracket assembly has a crank axle, a pair of bearing units and a pair of retaining clips. The bearing units are configured to be mounted in a tubular hanger part or bottom bracket tube of a bicycle frame.

U.S. Pub. No. 20070204722 published Sep. 6, 2007 discloses another bottom bracket assembly.

U.S. Pub. No. 20080056635 published Mar. 6, 2008 discloses a bottom bracket assembly for bicycles with two open ends with tapered, inner peripheries that seat specialized taper-roller bearings with tapered outer bearing races. A spindle featuring distal splines extends between the two bearings to rotatably attach crank arms via said splines.

U.S. Pub. No. 20080164673 published Jul. 10, 2008 discloses another bottom bracket assembly with beveled bearing races fitted to a shell with beveled inner peripheries. The bottom bracket shell may be threadless.

Other publications of interest include U.S. Pub. No. 20090145262 published Jun. 11, 2009; U.S. Pub. No. 20100220947 published Sep. 2, 2010; U.S. Pub. No. 20110126666 published Jun. 2, 2011, and U.S. Pub. No. 20130064488 published Mar. 14, 2013.

SUMMARY OF THE INVENTION

This invention provides an improved bottom bracket bearing assembly for use in composite, lightweight bicycles that require an unthreaded, press fit, or friction fit, assembly.

Our modular, bicycle bottom bracket assembly is designed for use with modern, composite bicycle frames for maintaining the critical pedal crankshaft bearings in proper alignment during strenuous use. Forces experienced by the crankshaft bearings might otherwise dislodge, disorient, or deform bearings, resulting in excessive friction on the crankshaft, which disadvantages the bicycle rider. The assembly is press fitted to the generally tubular, hollow bicycle bottom bracket shell to journal a crankshaft that supports conventional pedals engaged by a rider for propulsion.

The bottom bracket assembly comprises an elongated, rigid sleeve coaxially fitted within the bottom bracket shell. The bicycle crankshaft penetrates the sleeve. Preferably the rigid sleeve comprises a unibody piece machined from aluminum. A leading sleeve end, directed through the frame pass-through during installation, internally receives a radial contact bearing that is press fitted into a machined bore. A similar machined bore at the spaced apart sleeve terminal end receives another bearing. Each bearing bore comprises an interference fit zone for bearing retention and a larger diameter pressure relief zone. Preferably the relief zone has a channel facing an adjacent, progressive buffering slope that compensates for excessive pressures placed on the bearings by the crank. The bearings are protected by dust shields that coaxially abut the bearing exteriors. Preferably the assembly comprises an inner, tubular buttress bushing that coaxially occupies the tubular sleeve. It extends between the inner race of the spaced apart bearings to brace them for maintaining alignment.

The sleeve has a pair of integral, friction retention contact interfaces separated by a reduced diameter optimization zone. The contact interfaces have an external diameter that insures a tight press fit. The contact interfaces have a diameter greater than that of optimization zone. The sleeve terminal end has an integral stop flange that abuts the frame bottom bracket shell. The stop flange comprises an outer, ring-shaped portion with an integral bezel having a clearance face externally facing the inner face of a rotating crank arm.

Thus a very general object of our invention is to provide a bottom bracket bearing assembly for bicycles that reduces friction and increases reliability and efficiency.

A related object of our invention is to provide a bicycle bottom bracket bearing assembly in which potentially damaging stresses imparted to the bearings by inconsistent tolerances of the bicycle's molded composite frame are mitigated or eliminated.

Another object is to provide a lightweight bottom bracket bearing assembly that provides increased versatility with respect to the crank shaft assembly without compromising the strength of the bottom bracket bearing assembly.

A further object of our invention is to provide improved fitments for bearings installed in bicycle bearing module bores.

Another object is to prevent fretting/chattering of the crankshaft.

Another object is to enable smooth, low resistance pedaling.

Another object is to provide a bottom bracket bearing assembly that maintains alignment of the bearings' integral, constituent parts, such as inner and outer races and individual ball bearing, and reduces radial compression, or preload of said parts.

An object of the present invention is to provide a bicycle bottom bracket assembly that is relatively easy to service and/or replace due to its modular design.

A further object of the present invention is to provide a modular bicycle bottom bracket assembly of the character described in which the bearings will be aligned stably and retained against axial movements.

These and other objects and advantages of the present invention, along with features of novelty appurtenant thereto, will appear or become apparent in the course of the following descriptive sections.

BRIEF DESCRIPTION OF THE DRAWINGS

In the following drawings, which form a part of the specification and which are to be construed in conjunction therewith, and in which like reference numerals have been employed throughout wherever possible to indicate like parts in the various views:

FIG. 7 is an enlarged, sectional view taken generally along line 7-7 of FIG. 2;

FIG. 8 is an enlarged, fragmentary sectional view derived from circled region "8" in FIG. 7;

FIG. 9 is an enlarged, fragmentary sectional view that is similar to FIG. 7;

FIG. 10 is an enlarged, fragmentary sectional view derived from circled region "10" in FIG. 9;

DETAILED DESCRIPTION OF THE PREFERRED EMBODIMENTS

Figure 1:
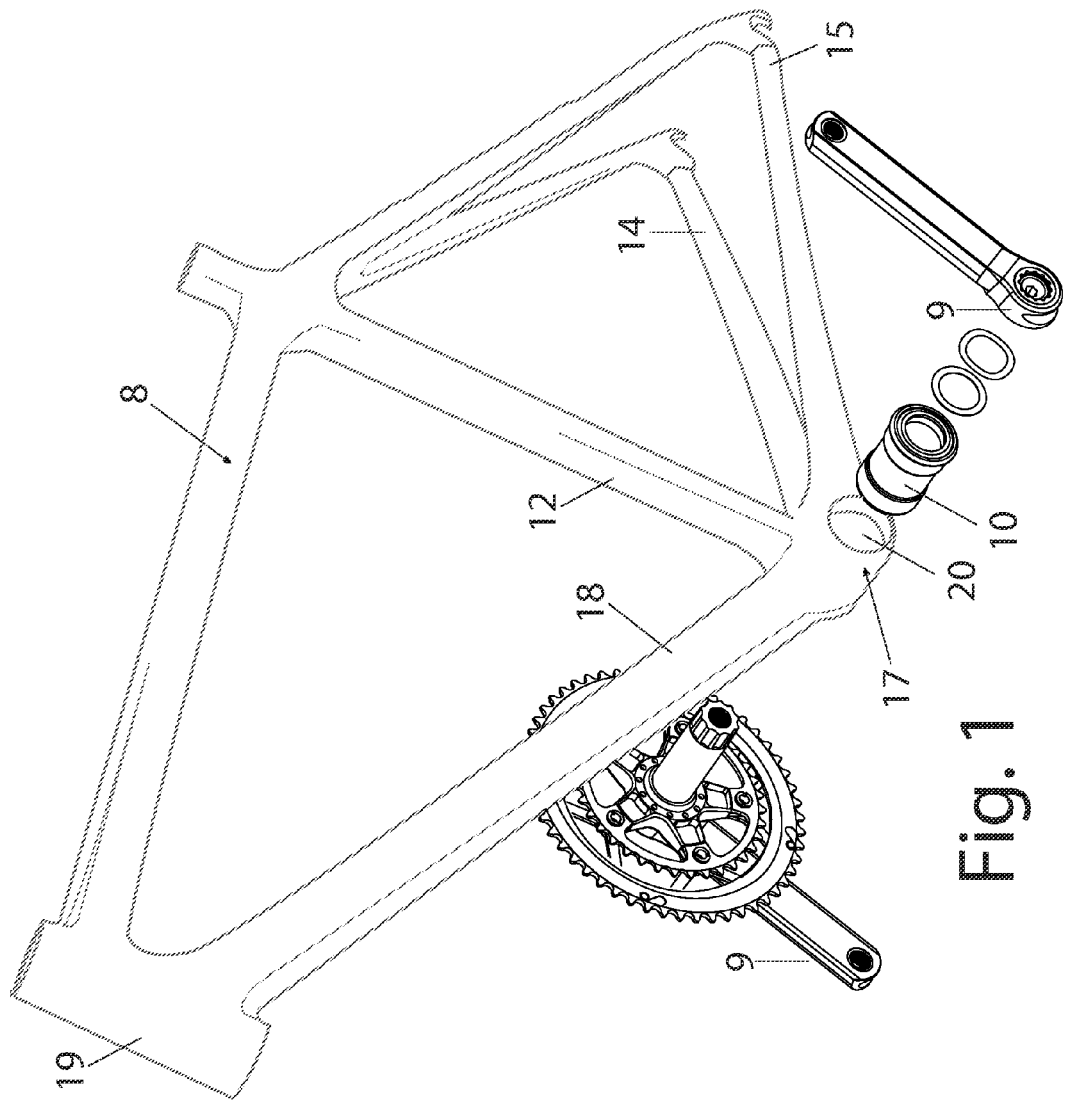
FIG. 1 is a fragmentary, exploded isometric view of a typical bicycle frame showing our modular bottom bracket bearing assembly in the installation position along with a typical crank-set assembly.
Figure 2:
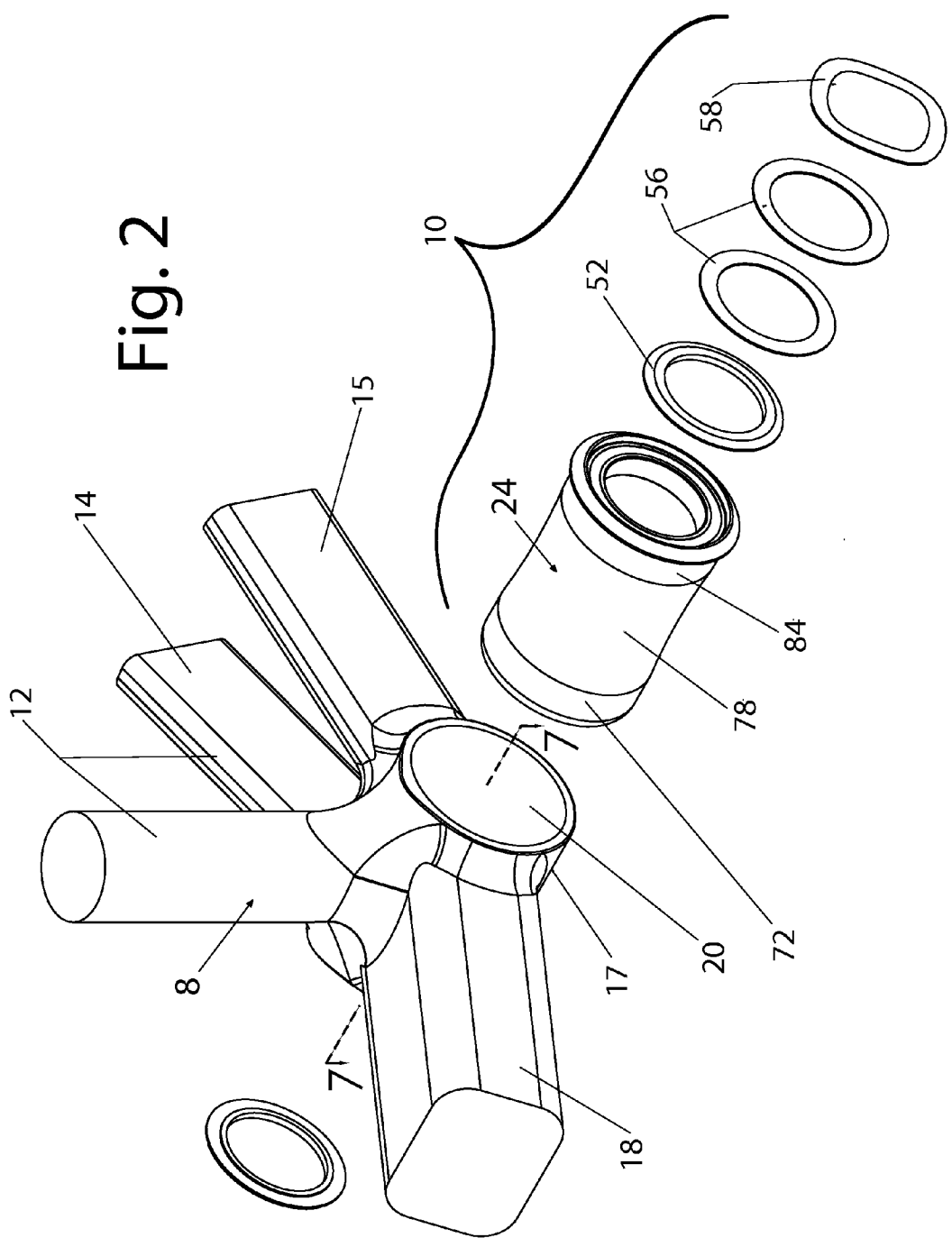
FIG. 2 is a fragmentary, exploded isometric view of our modular bottom bracket bearing assembly showing the unthreaded, press fit, or friction fit composite bicycle bottom bracket shell in which it is deployed.

Turning now to FIGS. 1 and 2, our modular bottom bracket bearing assembly 10 and a conventional, typical crank set 9 are disposed proximate a typical, unthreaded, press fit, or friction fit composite bicycle frame that is generally indicated by the reference numeral 8. FIG. 2 shows our modular bottom bracket assembly disposed proximate the lower section 9 of the typical, unthreaded, press fit or friction fit composite bicycle frame 8. Composite bicycle frame 8 comprises a frame reinforcement element 12 and a pair of diverging, tubular frame elements 14 and 15 that rearwardly project from the frame bottom bracket shell 17. As will be recognized by those skilled in the art, the bicycle rear wheel and suitable drive sprockets will be disposed between the ends of the elements 14, 15. A generally tubular, forwardly projecting frame downtube 18, extends from frame bottom bracket shell 17 at an angle with respect to the tubular frame elements 14 and 15, and supports steering tube 19 (FIG. 1) for the handle bar assembly (not shown). Frame bottom bracket shell 17 defines a generally tubular, hollow passageway or frame pass-through 20 into which a bottom bracket assembly is pressed to journal a spindle or crankshaft that supports conventional crank sets such as crank set 9 and conventional pedals (not shown). Our new modular bottom bracket assembly 10 is press fitted, or friction fitted into shell 20 to rotatably mount a spindle or crankshaft for low friction, highly efficient rotation.

Figure 3:
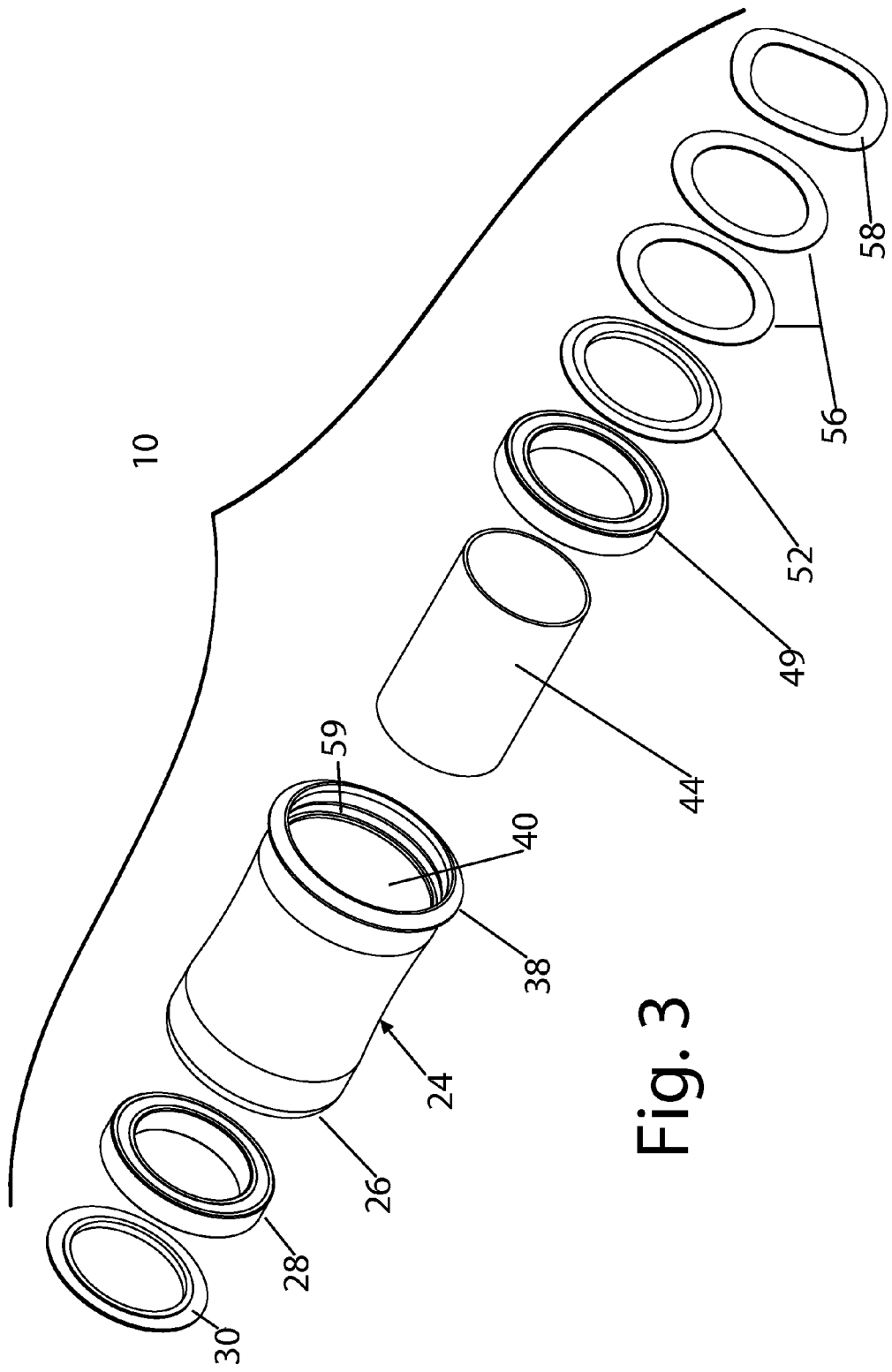
FIG. 3 is an enlarged, exploded isometric view of our modular bottom bracket assembly.
Figure 4:
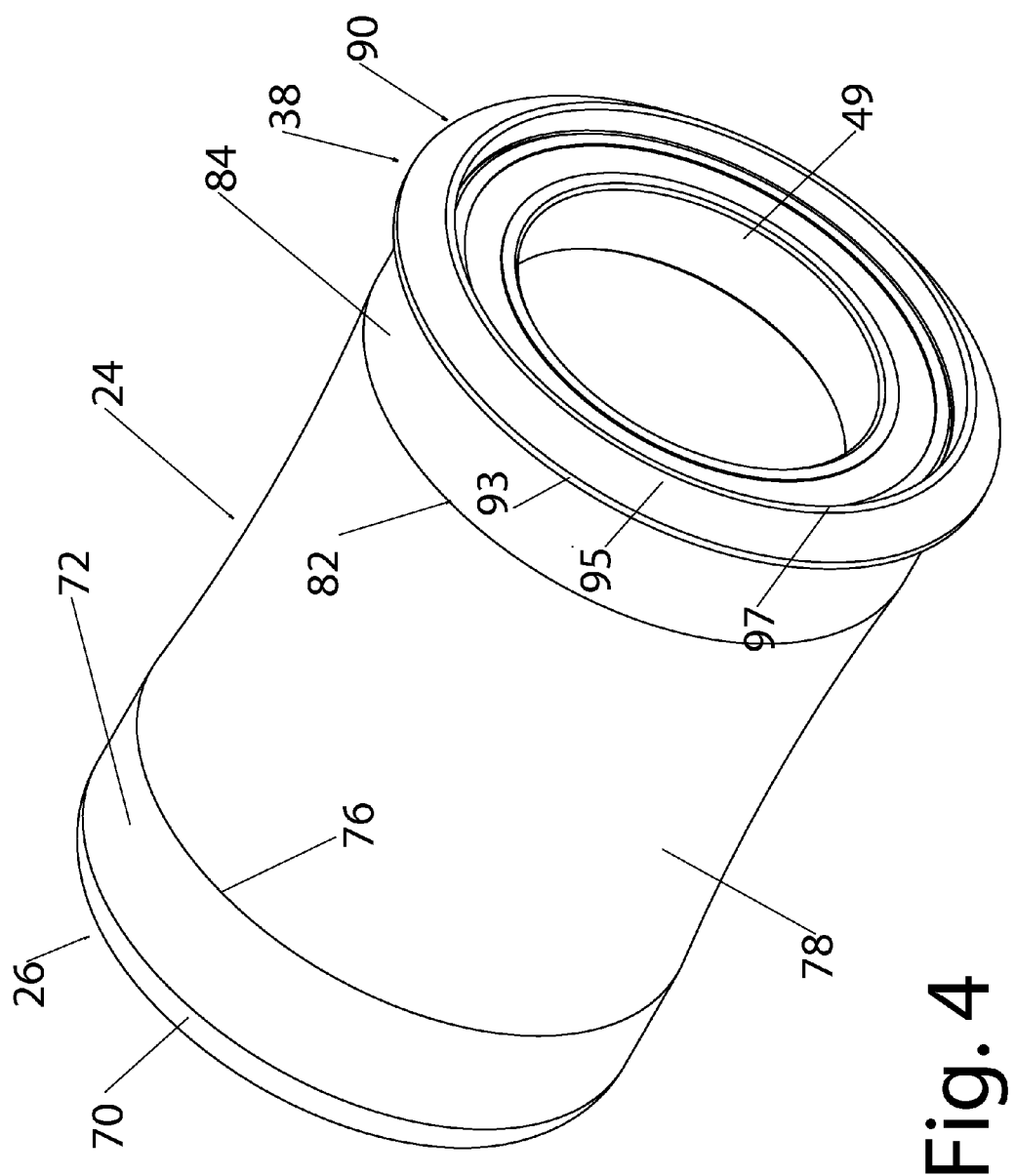
FIG. 4 is an enlarged, isometric view of the assembled modular bottom bracket assembly.
Figure 5:
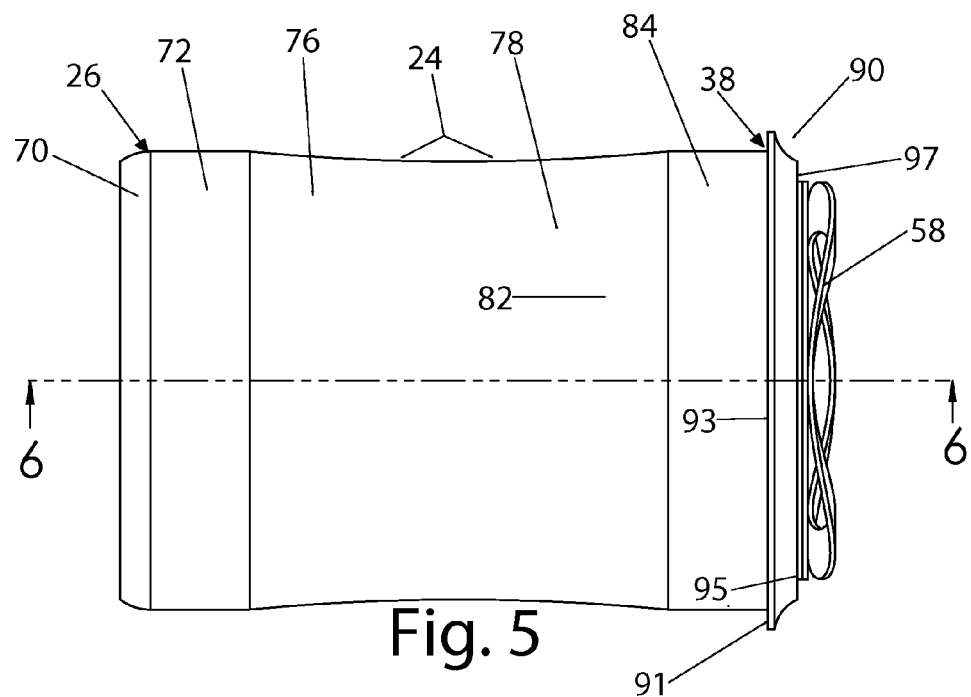
FIG. 5 is a side elevational view of the assembled modular bottom bracket assembly.
Figure 6:
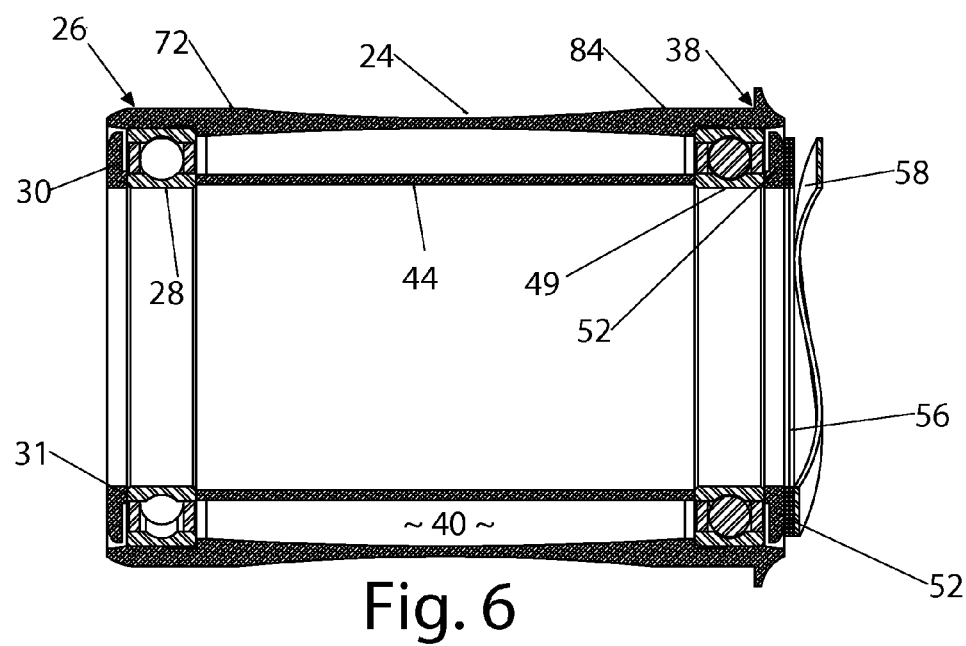
FIG. 6 is a longitudinal sectional view of the modular bottom bracket assembly taken generally along line 6-6 of FIG. 5.

With joint reference now directed to FIGS. 1-11, the preferred modular bottom bracket assembly 10 comprises an elongated, rigid, tubular, unibody sleeve 24 that is coaxially fitted within the frame pass-through 20. Sleeve 24 preferably comprises a single, unitary part that is machined from metal, such as aluminum, or steel. Alternatively sleeve 24 may be molded from plastic. The leading sleeve end 26 is directed into frame pass-through 20 when press fitting the assembly 10 into the bicycle frame shell 20 during installation. Sleeve end 26 coaxially, internally receives a radial contact bearing 28 (FIG. 3), that is press fitted into machined bearing bore 60, as seen in FIG. 10. A bearing bore 60 is disposed at each end of the sleeve 24. Each bearing bore 60 comprises an interference fit zone 62 and an adjacent, bearing pressure relief zone 61 (FIG. 10) whose diameter is greater than the diameter of fit zone 62. The interference fit zone 62 provides the press fit or friction fit surface required for bearing retention. Bearing pressure relief zone 61 is comprised of a channel 65 and an adjacent, progressive slope 67 that provides a buffer in case of excessive external pressure placed on bearings within housing 24 by the bicycle frame passage 20 in the event that frame passage 20 is not concentric or its diameter is otherwise out of specification. Radial contact bearing 28 is protected from debris during use by bearing dust shield 30 (FIG. 3). As best seen in FIG. 6, bearing dust shield 30 comprises an offset, internal coaxial lip 31 that provides clearance for the inner race of radial contact bearing 28 to rotate independently of said bearing's outer race, which is press fitted into sleeve end 26, and therefore stationary.

The terminal end of the tubular sleeve 24 has been generally designated by the reference numeral 38. Component parts described hereinafter are fitted through sleeve end 38, best seen in FIG. 3. These components include an inner, sleeve-like buttress bushing 44 that coaxially occupies tubular sleeve chamber 40 and extends between the inner race of radial contact bearing 28 and the inner race of identical, radial contact bearing 49 that is similarly press fitted into terminal sleeve end 38. Radial contact bearing 49 is contacted by a bearing dust shield 52 at terminal end 38 that is similar to dust cover 30 described above. As best seen in FIG. 8, bearing dust shield 52 has an integral offset, coaxial lip 53 that abuts the inner race of radial contact bearing 49 in sleeve end 38. Bearing dust shield 52 is depicted with a pair of optional 0.5 mm. shims 56 that are coaxially fitted against the dust cover 52 as needed to set proper compression of wave washer 58 during final fitment with a spindle or crankshaft. Radial contact bearings 28 and 49 both press fit within tubular sleeve 24, being precisely internally located a set distance apart during the final stage of press fitting by abutting suitable integral shoulders 59 (i.e., FIG. 2) at opposite interior ends of the sleeve.

Figure 11:
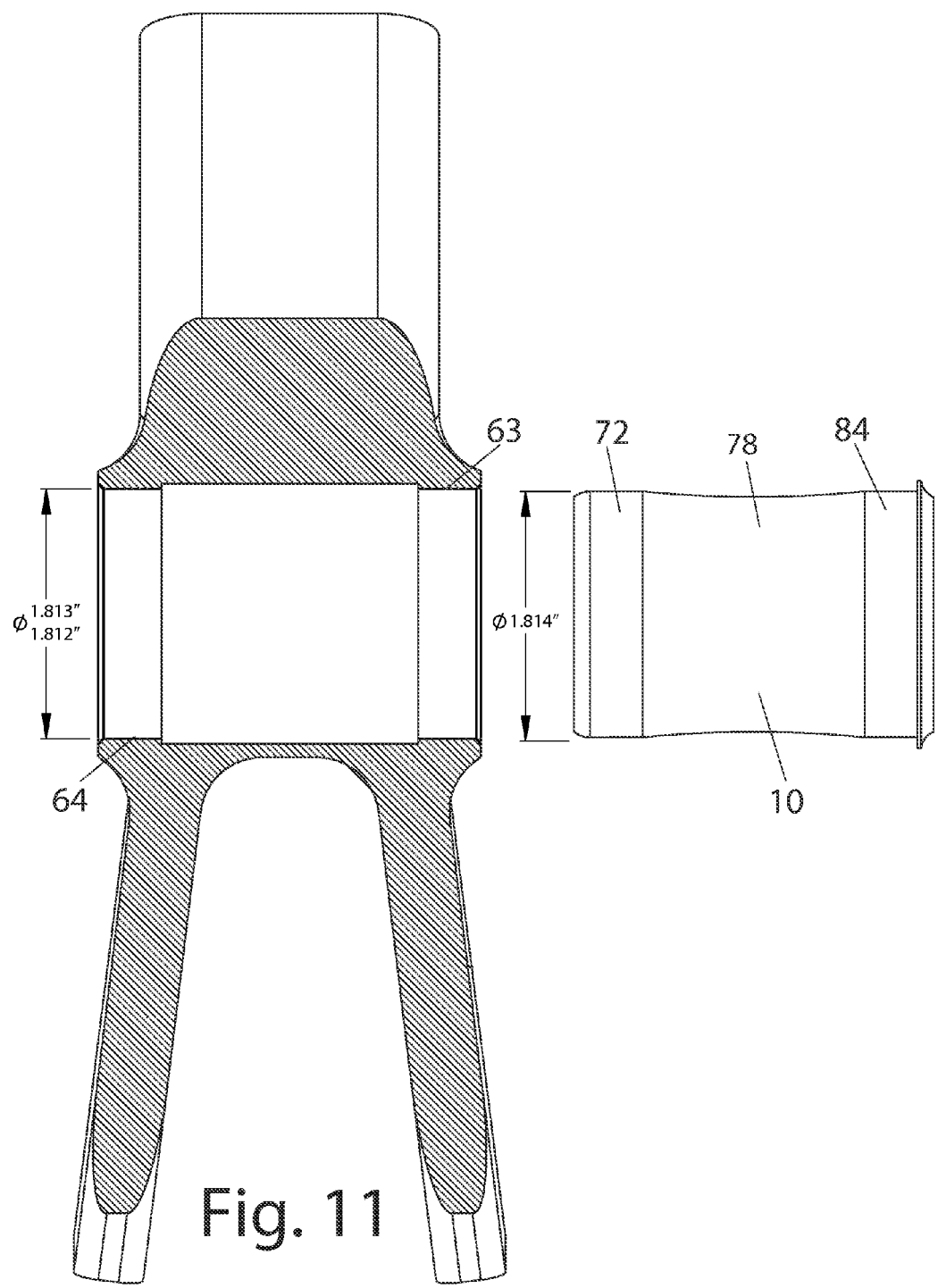
FIG. 11 is an enlarged, partially exploded fragmentary sectional view that is similar to FIGS. 7 and 9.

With emphasis now directed to FIGS. 4-6 and 11, tubular sleeve 24 has a preferred external configuration. End 26 has a press fit centering chamfer 70 that aids assembly. Centering chamfer 70 borders an integral, friction retention contact interface 72 that presents a raised external diameter of tubular sleeve 24. Said diameter is preferably 1.814" for Specialized branded Oversized Bottom Bracket, or OSBB-equipped bicycle frames, such as that depicted in FIG. 11. Dimensions vary from manufacturer to manufacturer. A transition region 76 separates contact interface 72 from central, tubular mass optimization zone 78 (FIG. 4). A transition region 82 separates contact interface 72 from another friction retention contact interface 84 that extends toward tubular end 38 of the tubular sleeve 24. Contact interfaces 72 and 84 are constructed substantially identically, possessing a diameter greater than that of mass optimization zone 78. Turning now to FIG. 11, contact surfaces 72 and 84 in this example are slightly larger than the contact surfaces 63 and 64, which are substantially identical. This difference provides the interference fit necessary to retain our modular bottom bracket bearing assembly 10.

With joint reference directed now to FIGS. 2, 4, 5, and 8, sleeve end 38 comprises an external, integral installation stop flange 90 that has a flange backstop 91 (FIG. 5) that abuts the frame bottom bracket shell 17 during the last stage of press fitment into frame pass-through 20. Stop flange 90 integrally borders contact interface 84. Stop flange 90 comprises an outer ring shaped portion 93 that adjoins an integral bezel 95 (FIG. 4). Clearance face 97 externally faces outward to provide proper clearance with the inner face of a rotating crank arm during use.

Figure 12:
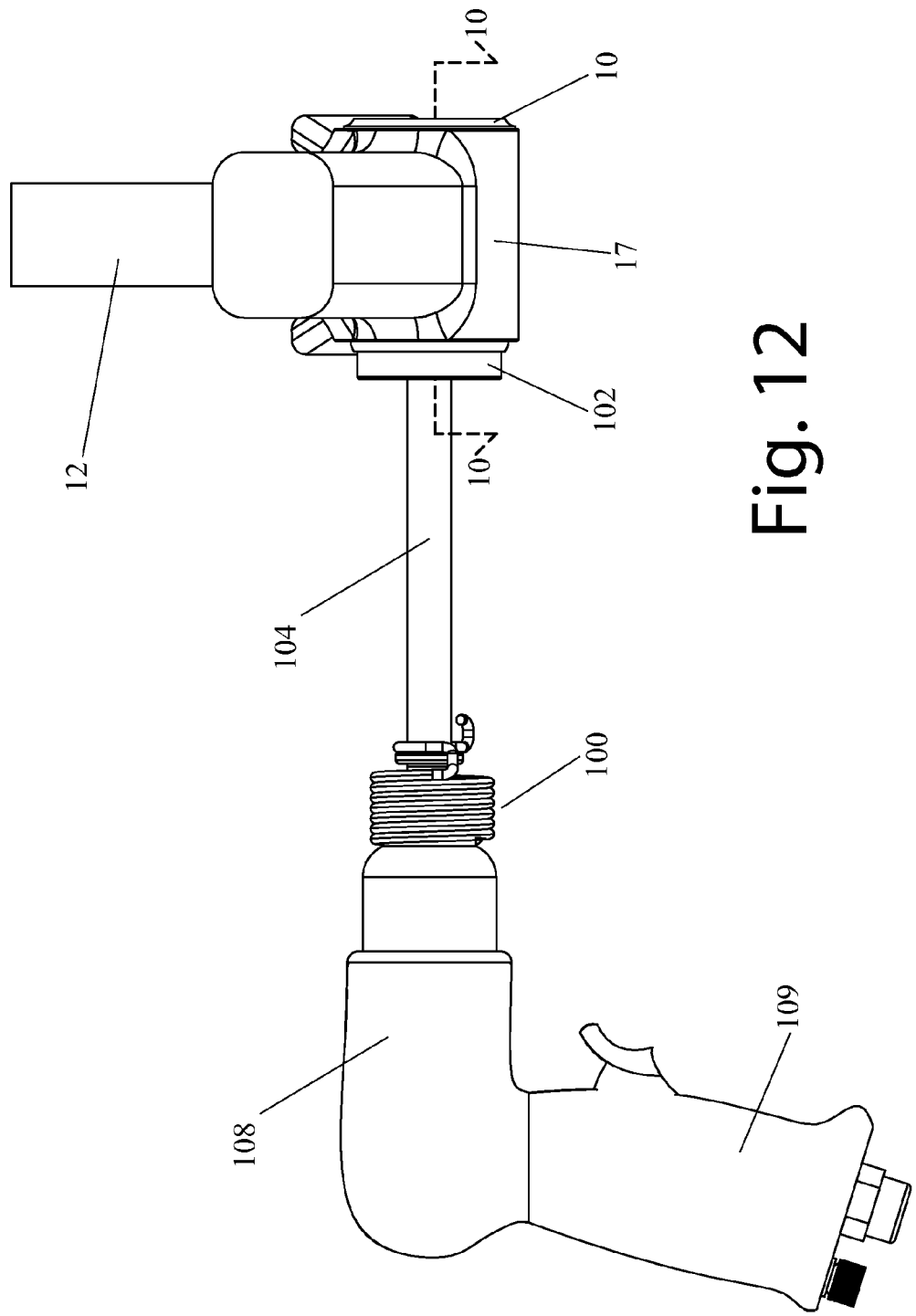
FIGS. 12 and 13 are diagrammatic views sequentially illustrating the removal process.
Figure 13:
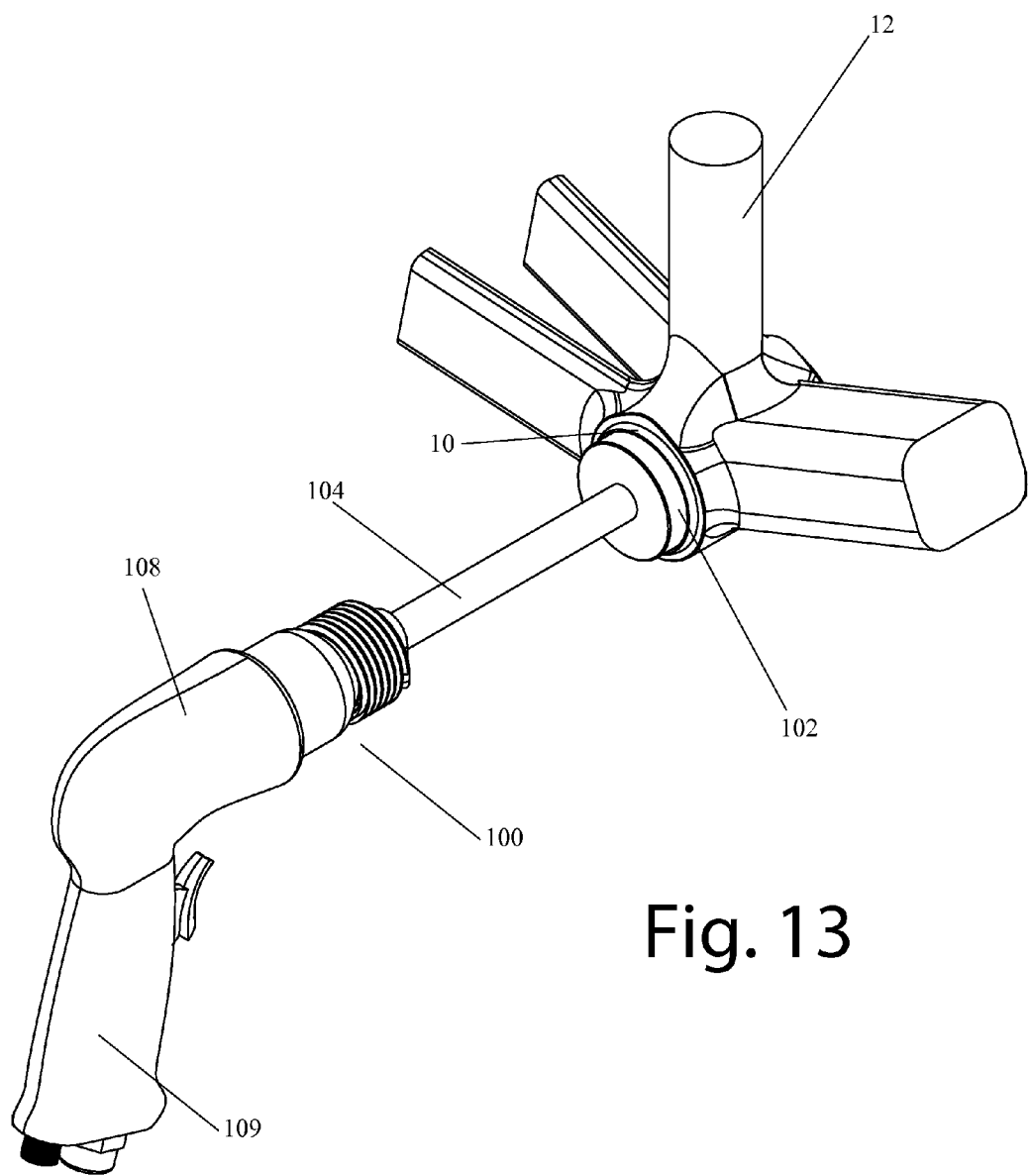
Figure 14:
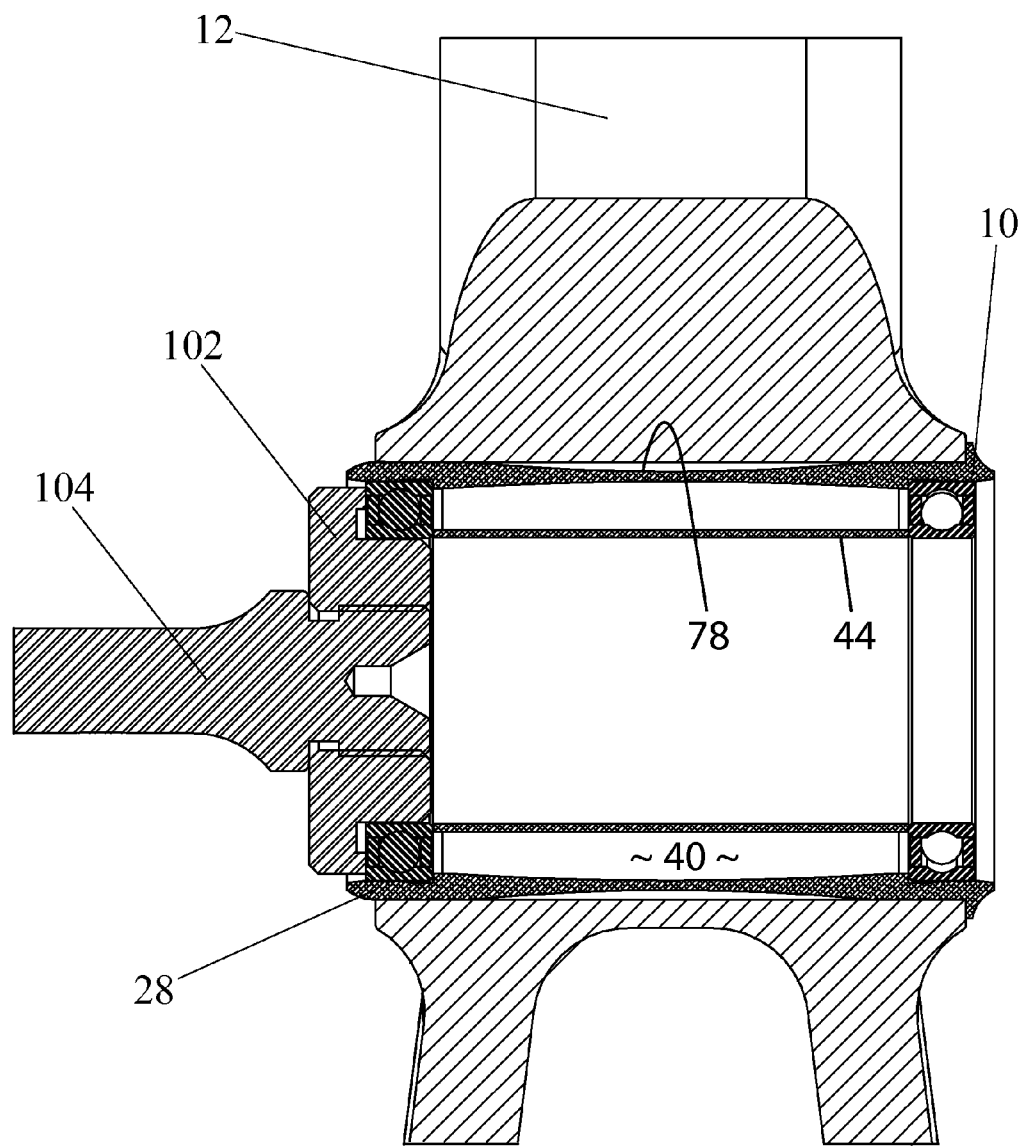
FIG. 14 is an enlarged, fragmentary sectional view of the modular bottom bracket assembly during the initial phase of the removal process taken generally along line 10-10 of FIG. 12.

FIGS. 12, 13, and 14 depict components, apparatuses, and procedures associated with the de-installation process for a modular bottom bracket assembly 10 from a frame pass-through 20 of a frame bottom bracket shell 17. De-installation die 102 threads onto die shank 104, both of our invention. Die shank 108 fits into a receptacle in an industry standard 1⅝" air hammer, generally referred to by 109, wherein it is retained by tool spring 100, which is threaded onto hammer body 108.

With emphasis on FIGS. 12, 13, and 14, depicted is the initial setup phase of a de-installation. De-installation die 102 interfaces with bearing 28 to drive modular bottom bracket assembly 10 from composite bicycle frame 8.

Figure 15:
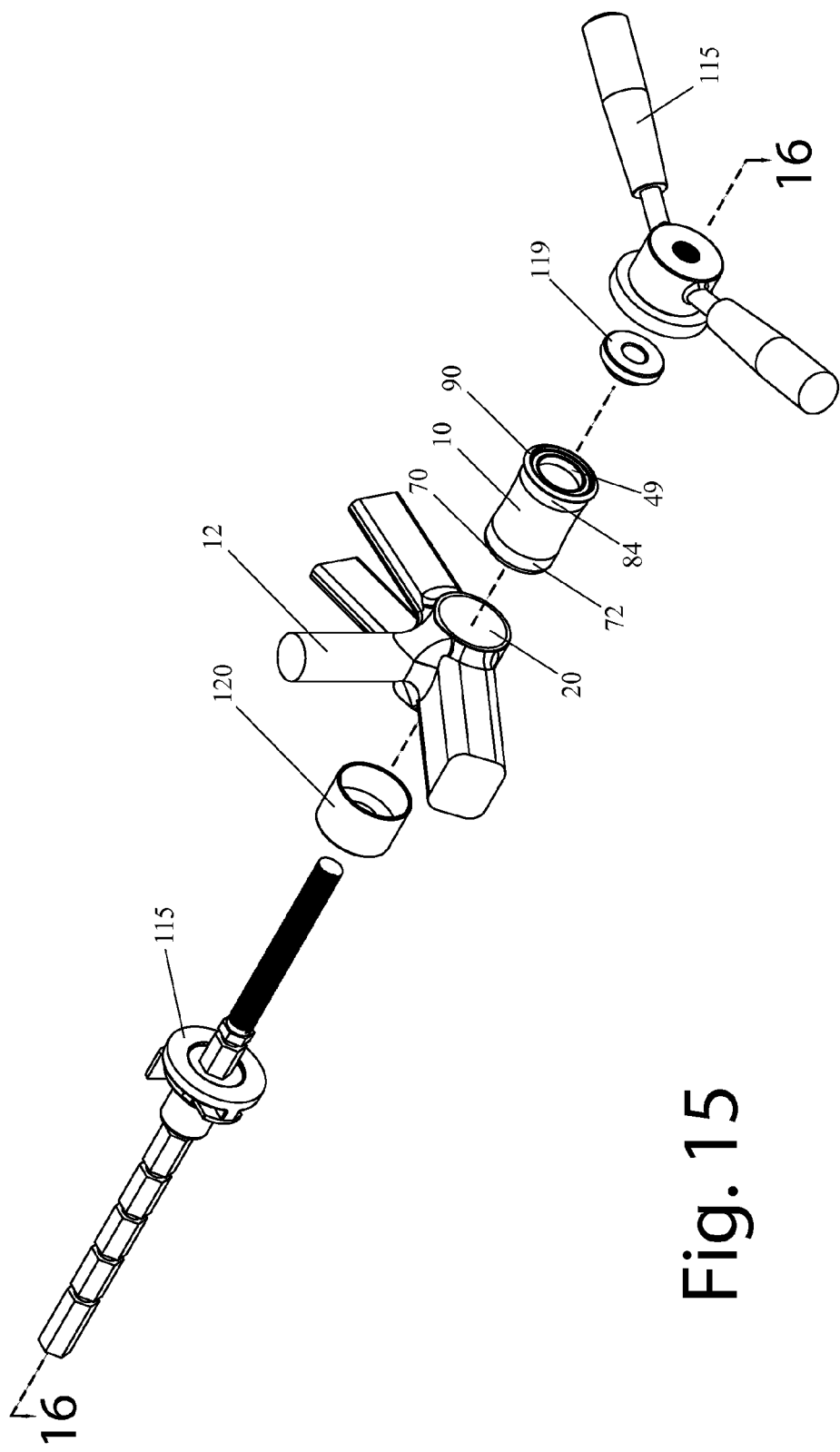
FIG. 15 is a partially fragmentary, exploded isometric view of the composite bicycle bottom bracket shell with a modular bottom bracket assembly aligned for installation with installation apparatuses.
Figure 16:
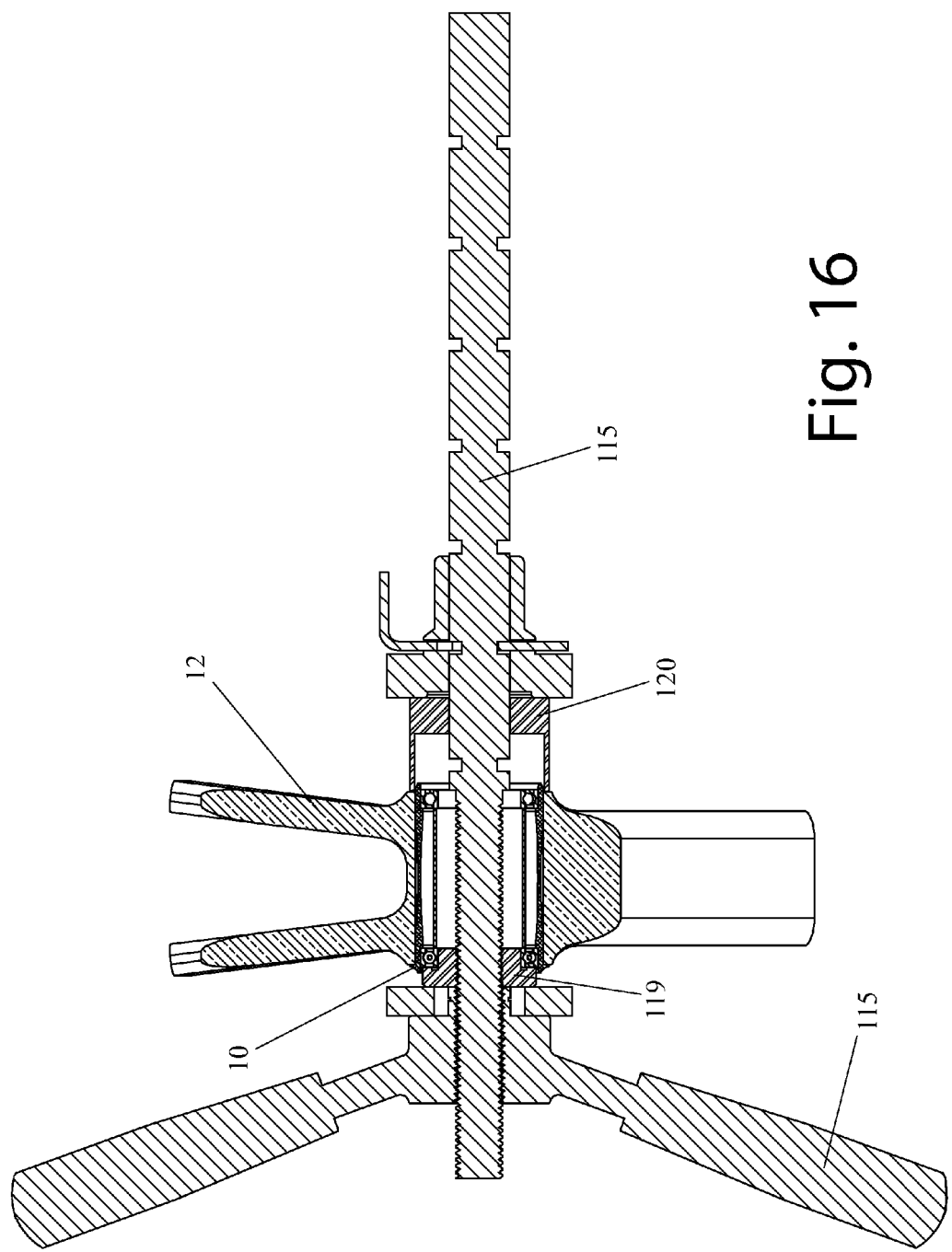
FIG. 16 is an enlarged, sectional assembly derived generally along line 16-16 of FIG. 15 with installation assembly substantially completed.

FIGS. 15 and 16 depict components, apparatuses, and procedures associated with the installation process for a modular bottom bracket assembly. Industry standard press 115 is fitted with module driver 119 and installation standoff, both of our invention. Module driver 119 contacts bearing 49 during press fit installation.

With joint reference to FIGS. 5 and 16, installation standoff 120 gives clearance as centering chamfer 70 and a portion of sleeve end 26 (FIG. 4) pushes through frame as flange backstop 91 abuts frame during the last stage of press fit procedure.

Installation Procedure

With joint reference directed now to FIGS. 3, 4, 7, 8, 11, 15, and 16, the installation procedure for our invention requires an industry standard press 115 (Brand: Park Tool, Model: HPP-2, depicted) to be used in concert with module driver 119 and installation standoff 120. Module driver 119 and installation standoff 120 are of our invention and are designed to interface with a modular bottom bracket assembly assembled to the point of that depicted in FIG. 4. FIG. 4 depicts a modular bottom bracket assembly ready for installation.

Installation components should be assembled as depicted in FIG. 15 to begin press fit installation. As industry standard press 115 is actuated, module driver 119 urges against radial contact bearing 28, thereby overcoming the friction of contact surfaces 72 and 84 against the inner surface of frame pass-through 20, contact surfaces 63 and 64. Pressing continues in like manner until flange backstop 91 abuts frame bottom bracket shell 17, seen best in FIG. 8. Installation is now complete.

De-Installation Procedure

With reference to FIGS. 6, 12, 13, and 14, De-installation die 102 threads onto die shank 104, both of our invention. Die shank 108 fits into a receptacle in an industry standard 1⅝" air hammer, generally referred to by 109, wherein it is retained for actuation by tool spring 100, which is threaded onto hammer body 108. So configured, upon actuation, air hammer 109 generates high frequency impacts which are translated as locomotive force by die shank 104 into de-installation die 102.

With emphasis on FIGS. 12 and 13, depicting the initial setup phase of a de-installation procedure, de-installation die 102 interfaces with bearing 28. Upon activation of air hammer 109, de-installation die 102 forcefully urges against bearing 28, thereby overcoming the friction fit between modular bottom bracket assembly 10, contact surfaces 72 and 84, and contact surfaces 63 and 64 of frame pass-through 20, driving modular bottom bracket assembly 10 free of frame bottom bracket shell 17. De-installation is now complete.

From the foregoing, it will be seen that this invention is one well adapted to obtain all the ends and objects herein set forth, together with other advantages which are inherent to the structure.

It will be understood that certain features and subcombinations are of utility and may be employed without reference to other features and subcombinations.

As many possible embodiments may be made of the invention without departing from the scope thereof, it is to be understood that all matter herein set forth or shown in the accompanying drawings is to be interpreted as illustrative and not in a limiting sense.

What is claimed is:

1. A bottom bracket bearing assembly for composite bicycle frames having a bottom bracket shell with a pass-through, the bracket bearing assembly comprising:

an elongated, rigid, tubular sleeve affixed to said bottom bracket shell, the sleeve comprising a leading sleeve end adapted to be directed into the pass-through during installation and an integral, spaced-apart terminal sleeve end;

the terminal sleeve end comprising an integral, external, installation stop flange that abuts the frame bottom bracket shell when the assembly is installed;

the leading sleeve end and the terminal sleeve end each comprising a bearing bore;

each bearing bore comprising an interference fit zone providing a friction fit required for bearing retention and an adjacent, bearing pressure relief zone having a diameter greater than the diameter of the interference fit zone, wherein each pressure relief zone comprises a channel and an adjacent, progressive slope providing a buffer for resisting excessive external pressure on a rolling bearing;

a rolling bearing coaxially disposed within and press fitted to the leading sleeve end bearing bore, and a spaced apart radial contact bearing coaxially disposed within and press fitted to the terminal sleeve end bearing bore; and, an inner, hollow buttress bushing coaxially disposed within said tubular sleeve that extends between and internally contacts the rolling bearing proximate each sleeve end.

2. The bottom bracket bearing assembly as defined in claim 1 further comprising:

a bearing dust shield coaxially disposed adjacent each radial contact bearing;

at least one shim coaxially fitted against the dust cover shield at said terminal sleeve end; and, a wave washer at said terminal sleeve end.

3. The bottom bracket bearing assembly as defined in claim 2 wherein each radial contact bearing dust shield comprises an offset, internal coaxial lip that provides clearance for the inner race of the adjacent radial contact bearing.

4. The bottom bracket bearing assembly as defined in claim 3 wherein said leading sleeve end comprises a press fit centering chamfer that aids assembly.

5. The bottom bracket bearing assembly as defined in claim 1 wherein said sleeve comprises a pair of spaced apart, integral, friction retention contact interfaces separated by a reduced diameter transition region.

6. The bottom bracket bearing assembly as defined in claim 5 wherein said stop flange comprises an outer clearance face that externally faces the inner face of a rotating crank arm during use.

7. The bottom bracket bearing assembly as defined in claim 6 wherein each radial contact bearing dust shield comprises an offset, internal coaxial lip that provides clearance for the inner race of the adjacent radial contact bearing.

8. The bottom bracket bearing assembly as defined in claim 7 wherein said leading sleeve end comprises a press fit centering chamfer that aids assembly.

9. A bottom bracket bearing assembly for composite bicycle frames having a bottom bracket shell with a pass-through, the bracket bearing assembly comprising:
   an elongated, rigid, tubular sleeve affixed to said bottom bracket shell, the sleeve comprising a leading sleeve end adapted to be directed into the pass-through during installation and an integral, spaced-apart terminal sleeve end;
   the terminal sleeve end comprising an integral, external, installation stop flange that abuts the frame bottom bracket shell when the assembly is installed;
   the leading sleeve end and the terminal sleeve end each comprising a bearing bore;
   each bearing bore comprising an interference fit zone providing a friction fit required for bearing retention and an adjacent, bearing pressure relief zone having a diameter greater than the diameter of the interference fit zone;
   a rolling bearing coaxially disposed within and press fitted to the leading sleeve end bearing bore, and a spaced apart radial contact bearing coaxially disposed within and press fitted to the terminal sleeve end bearing bore;
   a bearing dust shield coaxially disposed adjacent the rolling bearing;
   at least one shim coaxially fitted against the dust cover shield at said terminal sleeve end; and,
   a wave washer at said terminal sleeve end; and,
   an inner, hollow buttress bushing coaxially disposed within said tubular sleeve that extends between and internally contacts the rolling bearing proximate each sleeve end.

10. The bottom bracket bearing assembly as defined in claim 9 wherein each interference fit zone comprises a channel and an adjacent, progressive slope providing a buffer for resisting excessive external pressure on the rolling bearing.

11. The bottom bracket bearing assembly as defined in claim 10 wherein each radial contact bearing dust shield comprises an offset, internal coaxial lip that provides clearance for the inner race of the adjacent rolling bearing.

12. The bottom bracket bearing assembly as defined in claim 11 wherein said leading sleeve end comprises a press fit centering chamfer that aids assembly.

13. The bottom bracket bearing assembly as defined in claim 12 wherein said sleeve comprises a pair of spaced apart, integral, friction retention contact interfaces separated by a reduced diameter transition region.

14. The bottom bracket bearing assembly as defined in claim 13 wherein said stop flange comprises an outer clearance face that externally faces the inner face of a rotating crank arm during use.

* * * * *